(12) United States Patent
Carnes

(10) Patent No.: US 6,296,105 B1
(45) Date of Patent: Oct. 2, 2001

(54) BELT SCRAPER

(76) Inventor: Shaun K. Carnes, 33 Van Wyck Dr., Poughkeepsie, NY (US) 12601

( * ) Notice: Subject to any disclaimer, the term of this patent is extended or adjusted under 35 U.S.C. 154(b) by 0 days.

(21) Appl. No.: 09/469,063

(22) Filed: Dec. 21, 1999

(51) Int. Cl.[7] .................................................. B65G 45/16
(52) U.S. Cl. ............................................................ 198/499
(58) Field of Search ..................................... 198/497–499

(56) References Cited

U.S. PATENT DOCUMENTS

| | | |
|---|---|---|
| 3,631,968 | 1/1972 | Ward . |
| 4,098,394 | 7/1978 | Stahura ................. 198/499 |
| 4,202,437 | 5/1980 | Gordon ................. 198/497 |
| 4,249,650 * | 2/1981 | Stahura ................. 198/499 |
| 4,265,358 | 5/1981 | Veenhof ................. 198/499 |
| 4,344,525 | 8/1982 | Bancroft et al. ....... 198/499 |
| 4,359,150 | 11/1982 | Bowman et al. ....... 198/497 |
| 4,402,394 | 9/1983 | Stoll ...................... 198/499 |
| 4,533,036 | 8/1985 | Gordon . |
| 4,633,999 | 1/1987 | Perneczky ............. 198/499 |
| 4,799,716 | 1/1989 | Gordon . |
| 4,917,231 | 4/1990 | Swinderman . |
| 4,962,845 | 10/1990 | Gibbs ................... 198/499 |
| 5,197,587 * | 3/1993 | Malmberg ............. 198/499 |
| 5,201,402 | 4/1993 | Mott . |
| 5,218,412 | 6/1993 | Martin .................. 355/299 |
| 5,222,588 | 6/1993 | Gordon ................. 198/499 |
| 5,301,797 | 4/1994 | Hollyfield, Jr. et al. ... 198/499 |
| 5,518,107 * | 5/1996 | Schwarze ............. 198/499 |
| 5,944,167 * | 8/1999 | Brink .................... 198/499 |
| 5,950,803 * | 9/1999 | Schwarze ............. 198/499 |
| 5,975,281 * | 11/1999 | Yoshizake et al. .... 198/499 |
| 6,003,657 | 12/1999 | Mott ..................... 198/499 |
| 6,056,111 | 5/2000 | Stoll et al. ............ 198/497 |
| 6,056,112 | 5/2000 | Wiggins ............... 198/499 |

* cited by examiner

Primary Examiner—Christopher P. Ellis
Assistant Examiner—Mark A. Deuble
(74) Attorney, Agent, or Firm—William A. Bonk, III; Dykeme Gossett, PLLC

(57) ABSTRACT

An embodiment of a belt scraper constructed according to principles of the invention includes a blade mounted on a blade holder. The blade holder is mounted on a shaft. Each end of the shaft is retained by a pillow block. Each pillow block is mounted on a bracket. Each bracket mounts on a non-moving portion of a conveyor belt frame. The pillow blocks are adjusted to orient the blade relative to and urge the blade against a conveyor belt for optimal debris removal.

8 Claims, 3 Drawing Sheets

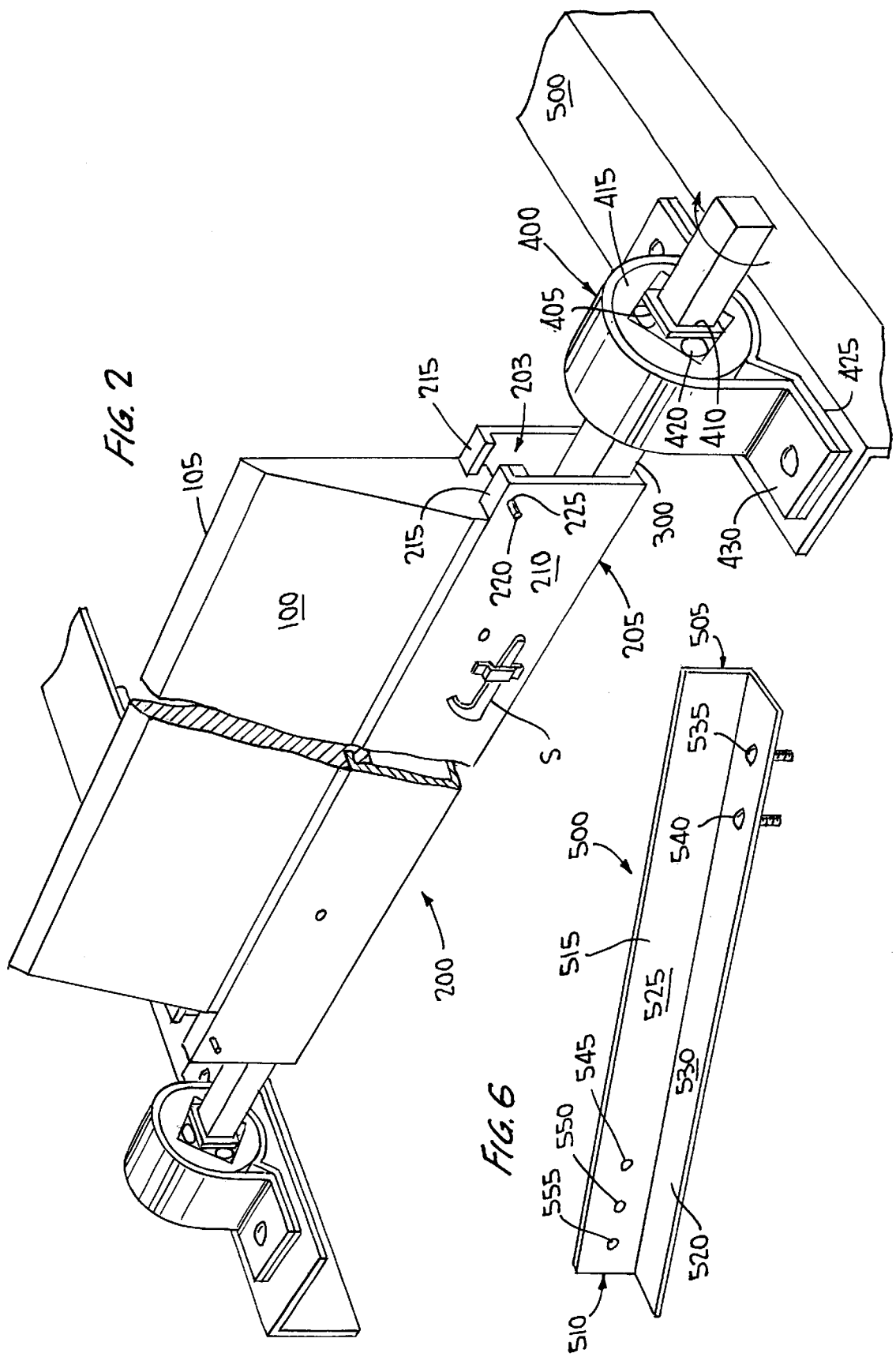

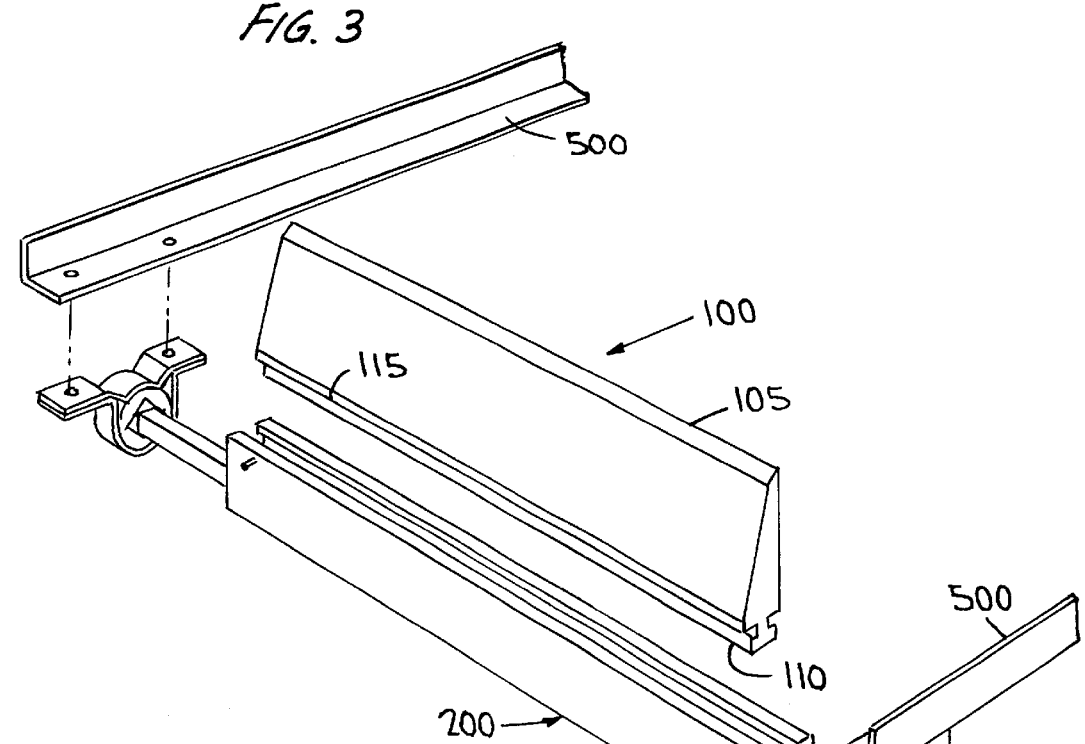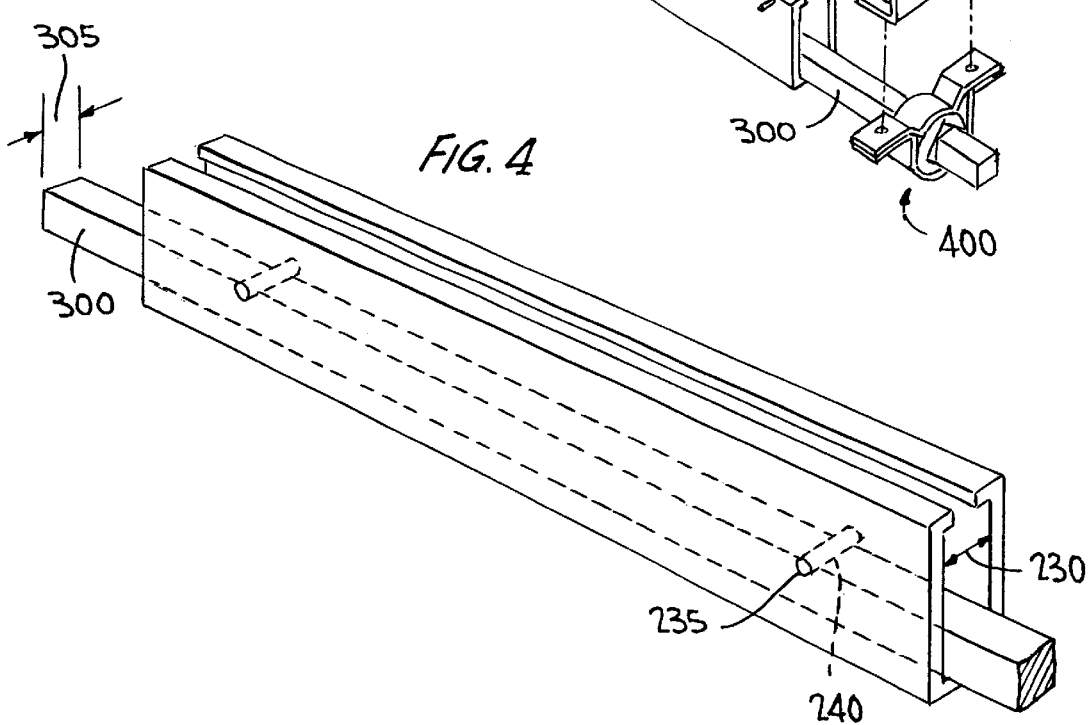

BELT SCRAPER

BACKGROUND OF THE INVENTION

1. Field of the Invention

The invention relates to conveyor belts. More specifically, the invention relates to a scraper for maintaining a conveyor belt.

2. Discussion of Related Art

Conveyor belts are used in many industrial applications, such as up-loading mined materials, down-loading hot asphalt and the like. Over the course of use, a conveyor belt often becomes caked with material conveyed by the conveyor belt. Material buildup on a conveyor belt is not desirable for many reasons, not the least of which pertaining to good maintenance practices.

Blade-type cleaners frequently are used to clear a conveyor belt of material that adheres to the conveyor belt surface. A blade type conveyor belt cleaner typically includes an elongated member having an edge that contacts the conveyor belt and chips or shaves off unwanted material remaining on the conveyor belt.

Conveyor belt cleaners frequently work in hostile conditions and are subjected to considerable abrasion not only from be belt, but from residual materials clinging to the belt. Thus, to satisfactorily clean a conveyor belt, a conveyor belt cleaner must be serviced, adjusted and maintained continuously.

Although belt scraper blades are constructed from rugged material, wear is unavoidable. When a blade is worm, it must be replaced However, ascertaining when a blade is sufficiently worn or may continue to perform satisfactory service is not always an easy task. What is needed is a blade that displays wear characteristics to indicate to a belt scraper serviceperson when replacement is appropriate.

Belt scraper blade pressure against the conveyor belt generally is guided by two conflicting principles: (1) maximum scraping of material from the conveyor belt; and (2) minimum wear on the conveyor belt. As the blade wears, less blade contacts the conveyor belt, resulting in less pressure being exerted against the conveyor belt. To maintain generally constant pressure against the conveyor belt, the blade pressure must be adjusted regularly. What is needed is a blade pressure adjustment mechanism that is easy to adjust on a regular basis.

Unfortunately, no conveyor belt scrapers available provide an infinitely rotatably-adjustable and tensionable replaceable blade having visible wear indicia.

SUMMARY OF THE INVENTION

The invention is a belt scraper with an infinitely rotatably-adjustable and tensionable replaceable blade having visible wear indicia.

The invention scrapes material from a conveyer belt so that unwanted residual material on a conveyor belt does not build up on the conveyor belt or fall from the conveyor belt and create a hazard or unkempt appearance. The invention provides for ready blade installation and replacement. The invention provides for ready observation of whether the blade requires replacement. The invention provides for ready adjustment of blade pressure against the conveyor belt to maximize conveyor belt scraping and minimize conveyor belt wear. The invention provides improved elements and arrangements thereof, in an apparatus for the purposes described which are inexpensive, dependable and effective in accomplishing intended purposes of the invention.

An embodiment of a belt scraper constructed according to principles of the invention includes a blade mounted on a blade holder. The blade holder is mounted on a shaft. Each end of the shaft is retained by a pillow block. Each pillow block is mounted on a bracket. Each bracket mounts on a non-moving portion of a conveyor belt frame. The pillow blocks are adjusted to orient the blade relative to and urge the blade against a conveyor belt for optimal debris removal.

These and other features of the invention will be appreciated more readily in view of the drawings and detailed description below.

BRIEF DESCRIPTION OF THE DRAWINGS

The invention is described in detail below with reference to the following figures, throughout which similar reference characters denote corresponding features consistently, wherein:

FIG. 2 is an enlarged top front right elevational view of the belt scraper of FIG. 1;

FIG. 3 is a partial exploded top front right elevational view of the embodiment of FIG. 2;

FIG. 4 is a top front right elevational view of an embodiment of a blade holder and shaft of the embodiment of FIG. 2;

FIG. 6 is a bottom front left side elevational view of an embodiment of a bracket of the embodiment of FIG. 2.

DETAILED DESCRIPTION OF THE INVENTION

The invention is a belt scraper with an infinitely rotatably-adjustable and tensionable replaceable blade having visible wear indicia.

Figure 1:
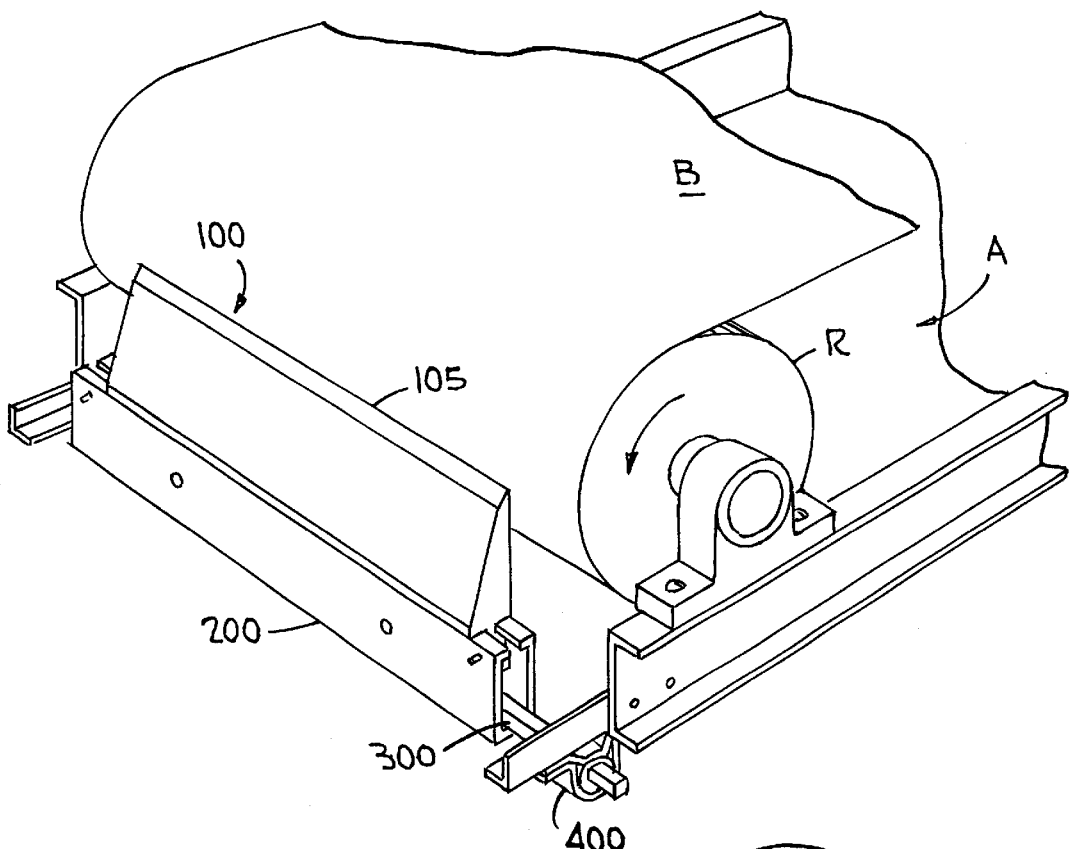
FIG. 1 is an environmental perspective view of an embodiment of a belt scraper constructed according to principles of the invention mounted on a conveyor belt frame.

Referring to FIGS. 1 and 2, an embodiment of a belt scraper constructed according to principles of the invention includes a blade 100 mounted on a blade holder 200. The blade holder 200 is mounted on a shaft 300. Each end of the shaft 300 is retained by a pillow block 400. Each pillow block 400 is mounted on a bracket 500. Each bracket 500 mounts on a non-moving portion of a conveyor belt frame A. The pillow blocks 400 orient the blade 100 relative to and urge the blade 100 against the conveyor belt B for optimal debris removal.

Referring also to FIG. 3, a blade constructed according to principles of the invention has a beveled edge 105 for shaving undesired materials clinging to the conveyor belt B. The blade 100 has a foot 110 configured to be retained by the blade holder 200. To that end, the foot 110 has transverse grooves 115 coextensive with the width of the blade 100. Preferably, the blade is 16, 22, 28, 34, 40, 46, 52, 58 or 70 inches wide, or any suitable width.

The blade 100 is constructed so that, as the blade 100 wears, the blade 100 displays wear indicia which apprises a serviceperson that the blade 100 may need to be serviced or replaced. Preferably, the blade 100 is fabricated from molded urethane. One embodiment of the invention provides that the urethane exhibit graduated coloration or shading along the length of the blade 100 from the edge 105 to the foot 110. This may be in the form of pigments, dyes or other suitable technique known in the art. Another embodiment of the invention provides that the urethane exhibit distinguishable adjacent or separated bands or lines along the length of the blade 100.

A blade holder 200 constructed according to principles of the invention may be formed to define an elongated, C-shaped channel 203 with a base 205 and upstanding walls 210. The walls 210 terminate with inwardly-extending flanges 215. Preferably, the flanges 215 are closely received in the corresponding grooves 115 of the blade 100.

The blade holder 200, preferably, ranges from 18 to 72 inches long and is approximately 1½ inches wide. The flanges 215, preferably, have a thickness of approximately ⅛ inch, as measured along the length of the blade 100.

Once the blade 100 is installed in the blade holder 200, pins 220 are inserted in holes 225 of the blade holder 200. The pins 220 restrain the foot 110 of the blade 100 from transverse movement along the blade holder 200.

Referring also to FIG. 4, a shaft 300 constructed according to principles of the invention may be constructed from square stock, preferably having a side measuring ⅞ inch wide, which is ground to 22 mm at each end The shaft 300 should extend beyond each end of the blade holder 200, preferably, about six inches. Preferably, the shaft 300 has a width 305 complementary of the width 230 of the blade holder 200. A spanner wrench S, for adjusting the pillow blocks 400, may be conveniently, removably attached to a side of the blade holder 200. The shaft 300 is press fit or welded in the channel 203.

Referring again to FIG. 2, a pillow block 400 constructed according to principles of the invention is a Rosta® Rubber element manufactured by Rosta-Werk AG. The pillow block 400 performs the functions of a bearing, shock absorber and tensioning unit. Each pillow block includes a sleeve 405 having a square-shaped aperture 410, for receiving an end of the shaft 300, with an axis coaxial with the shaft 300. The sleeve 405 is biased relative to an element 415 with pre-stressed rubber elements 420. The element 415 is retained and selectably prevented from rotating about the axis by a base plate 425 and a mating housing 430.

Figure 5:
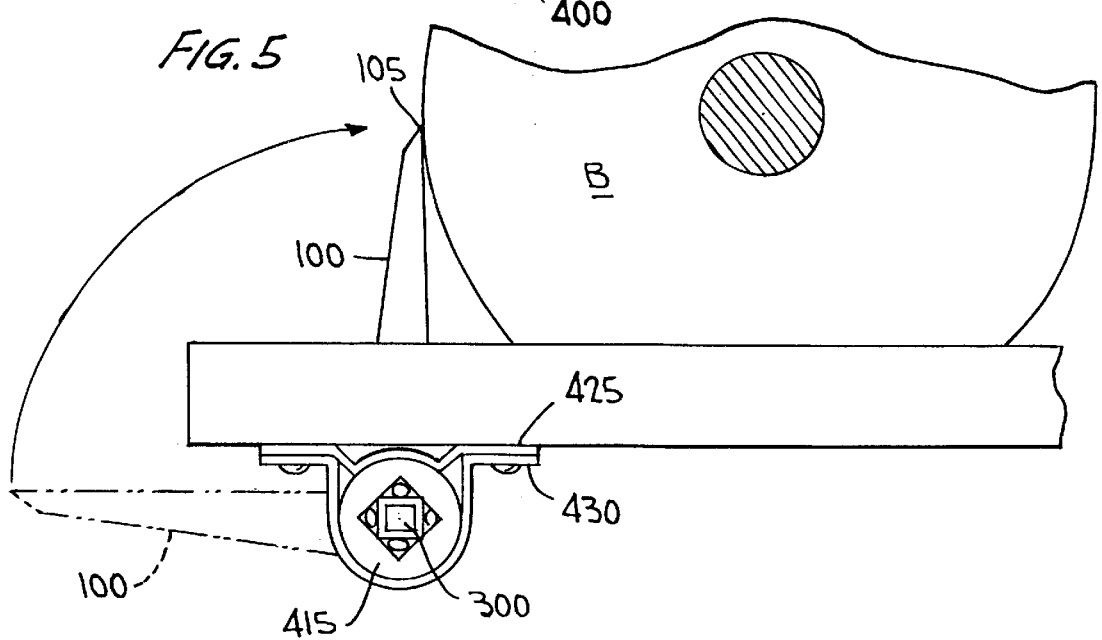
FIG. 5 is a right side elevational view of the embodiment of FIG. 1.

Referring also to FIG. 5, when the base plate 425 and housing 430 are sufficiently loosened, the element 415 may be rotated about the axis to adjust the orientation of the shaft 300. Adjusting the orientation of the shaft 300 correspondingly alters the attitude of the blade 100 or pressure exerted by the blade 100 against the conveyor belt B. The blade 100 should be held against the conveyor belt with sufficient tension to urge the tip 105 of the blade 100 to dislodge and remove unwanted material from the conveyor belt B, but not wear the conveyor belt B or blade 100 prematurely.

Referring to FIG. 6, a bracket 500 constructed according to principles of the invention has a first end 505 and a second end 510. The first end 505 is adapted to receive a coupler 400. The second end 510 is adapted to mount on a non-moving component of a conveyor belt B.

The bracket 500 preferably is fabricated from angle stock, defining a vertical strip 515 and a horizontal strip 520. The vertical strip 515 has an inner side 525 and an outer side (not shown). The horizontal strip 520 has an upper side 530 and a lower side (not shown). The vertical strip 515 and the horizontal strip 520, preferably, are 3/16 inch thick, 2 inches wide, and approximately 30 inches long.

The first end 505 of the horizontal strip 520 has holes 535 and 540 for receiving threaded fasteners 600. The holes 535 and 540 are centered across the width of the horizontal strip 520. The hole 535 is located approximately two inches from the first end 505. The hole 540 is located approximately 3⅝ inches from the hole 535.

The threaded fasteners 600, preferably, are carriage bolts measuring ⅜ inch wide by 1¼ inches long. The threaded fasteners 600 also may be tack welded onto the bracket 500.

The second end 510 of the vertical strip 515 has holes 545, 550 and 555 centered across the width of the vertical strip 515 at approximately five-inch intervals. The holes 545, 550 and 555 receive threaded fasteners for connecting the brackets 500 to the conveyer belt frame. The brackets 500 also may be welded to a conveyor belt frame.

Referring again to FIG. 1, the invention is shown installed on a conveyor belt frame A. The conveyor belt frame A has a roller R that drives the conveyor belt B. As shown in FIG. 7, the roller R rotates in a counterclockwise direction. The edge 105 of the blade 100 contacts the conveyor belt B on the opposite side of the side driven by the roller R As the conveyor belt B passes against the edge 105, the edge 105 shaves unwanted matter from the conveyor belt B.

The invention is not limited to the foregoing, but encompasses all improvements and substitutions consistent with the principles of the invention.

I claim:

1. A belt scraper comprising a pillow block for urging a blade against a conveyer belt with a force, said pillow block comprising:

an element adapted to connect to the blade; and a housing, configured to rotatably maintain said element, rotatably fixed relative to the conveyer belt;

wherein said housing releaseably restrains said element from moving;

said element being sleeved in and infinitely adjustable relative to said housing, wherein rotating said element relative to said housing correspondingly alters the force.

2. The belt scraper of claim 1, said housing including a first plate and a second plate configured to cooperatively squeeze said element.

3. The belt scraper of claim 1, further comprising a sleeve, adapted to connect to the blade, received in said element.

4. The belt scraper of claim 3, wherein said sleeve is biased relative to said element.

5. A belt scraper comprising a blade configured to exhibit properties corresponding to graduations of wear.

6. The belt scraper of claim 5, wherein said blade contains substantially no metal.

7. The belt scraper of claim 5, wherein said blade, having a tip for contacting a conveyor belt and a foot configured to be maintained by a blade holder, exhibits distinguishable coloration between said tip and said foot as said blade wears.

8. The belt scraper of claim 7, said distinguishable coloration being selected from continuously-varying coloration; adjacent bands; non-contiguous bands; and combinations thereof.

* * * * *